(12) United States Patent  
Lee et al.

(10) Patent No.: US 10,997,947 B2  
(45) Date of Patent: May 4, 2021

(54) ELECTRONIC DEVICE AND CONTROL METHOD THEREOF

(71) Applicant: SAMSUNG ELECTRONICS CO., LTD., Suwon-si (KR)

(72) Inventors: Bong-Geun Lee, Hwaseong-si (KR); Tae-Gyoung Ahn, Yongin-si (KR); Soo-Hong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 16/163,809

(22) Filed: Oct. 18, 2018

(65) Prior Publication Data

US 2019/0371268 A1 Dec. 5, 2019

Related U.S. Application Data

(60) Provisional application No. 62/677,917, filed on May 30, 2018, provisional application No. 62/677,454, filed on May 29, 2018.

(30) Foreign Application Priority Data

Jul. 31, 2018 (KR) .......................... 10-2018-0088934

(51) Int. Cl.
    *G09G 5/10* (2006.01)
    *H04N 5/58* (2006.01)
    (Continued)

(52) U.S. Cl.
    CPC .................. *G09G 5/10* (2013.01); *G06N 3/08* (2013.01); *G06T 5/009* (2013.01); *H04N 5/58* (2013.01); *G09G 2320/0233* (2013.01)

(58) Field of Classification Search
None
See application file for complete search history.

(56) References Cited

U.S. PATENT DOCUMENTS 7,825,955 B2    11/2010   Kato
8,605,111 B2    12/2013   Moon et al.
(Continued)

FOREIGN PATENT DOCUMENTS

JP    2014-192227 A    10/2014
KR    10-0225040 A    10/1999
(Continued)

OTHER PUBLICATIONS

Search Report (PCT/ISA/210) dated Apr. 4, 2019, issued by International Searching Authority in counterpart International Application No. PCT/KR2019/000092.
(Continued)

*Primary Examiner* — Stephen T. Reed
(74) *Attorney, Agent, or Firm* — Sughrue Mion, PLLC

(57) ABSTRACT

An electronic device is provided. The electronic device includes a storage; and a processor configured to: identify, based on a luminance value of each pixel included in a global area of an image stored in the storage, a first cumulative distribution of the global area, identify, based on a luminance value of each pixel included in a local area of the image, a second cumulative distribution of the local area, correct the luminance value of each pixel included in the local area based on the first cumulative distribution and the second cumulative distribution to generate a corrected luminance value of each pixel included in the local area, and generate a corrected image signal based on the corrected luminance value of each pixel included in the local area.

18 Claims, 25 Drawing Sheets

(51) Int. Cl.
  *G06T 5/00*  (2006.01)
  *G06N 3/08*  (2006.01)

(56) References Cited

U.S. PATENT DOCUMENTS

| | | | |
|---|---|---|---|
| 9,773,300 | B2 | 9/2017 | Min et al. |
| 9,870,606 | B2 | 1/2018 | Bordes et al. |
| 2010/0157078 | A1 | 6/2010 | Atanassov et al. |
| 2013/0176400 | A1 | 7/2013 | Jang et al. |
| 2015/0110399 | A1 | 4/2015 | Valdes Lopez et al. |
| 2015/0186987 | A1 | 7/2015 | Madhuranath et al. |
| 2016/0104438 | A1 | 4/2016 | Han et al. |
| 2016/0232419 | A1* | 8/2016 | Bai .................. G06T 5/007 |
| 2017/0039967 | A1* | 2/2017 | Jung .................. G06T 5/40 |
| 2017/0262962 | A1* | 9/2017 | Rad .................. G06F 17/18 |
| 2018/0089799 | A1* | 3/2018 | Johnson .................. G06T 5/40 |
| 2018/0108327 | A1* | 4/2018 | Jung .................. G06T 5/008 |
| 2019/0362478 | A1* | 11/2019 | Nanda .................. H04N 1/6086 |

FOREIGN PATENT DOCUMENTS

| | | |
|---|---|---|
| KR | 10-2003-0070692 A | 9/2003 |
| KR | 10-0437810 B1 | 6/2004 |
| KR | 10-0459993 B1 | 12/2004 |
| KR | 10-2008-0010674 A | 1/2008 |
| KR | 10-0834638 B1 | 6/2008 |
| KR | 10-0906606 B1 | 7/2009 |
| KR | 10-2013-0080614 A | 7/2013 |
| KR | 10-1461995 B1 | 11/2014 |
| KR | 10-2015-0097367 A | 8/2015 |

OTHER PUBLICATIONS

Written Opinion (PCT/ISA/237) dated Apr. 4, 2019, issued by International Searching Authority in counterpart International Application No. PCT/KR2019/000092.

Communication dated Feb. 15, 2021, issued by the European Patent Office in counterpart European Application No. 19812294.7.

Kim et al., "An Advanced Contrast Enhancement Using Partially Overlapped Sub-Block Histogram Equalization," IEEE Transactions on Circuits and Systems for Video Technology, vol. 11, No. 4, Apr. 2001, pp. 475-484.

* cited by examiner

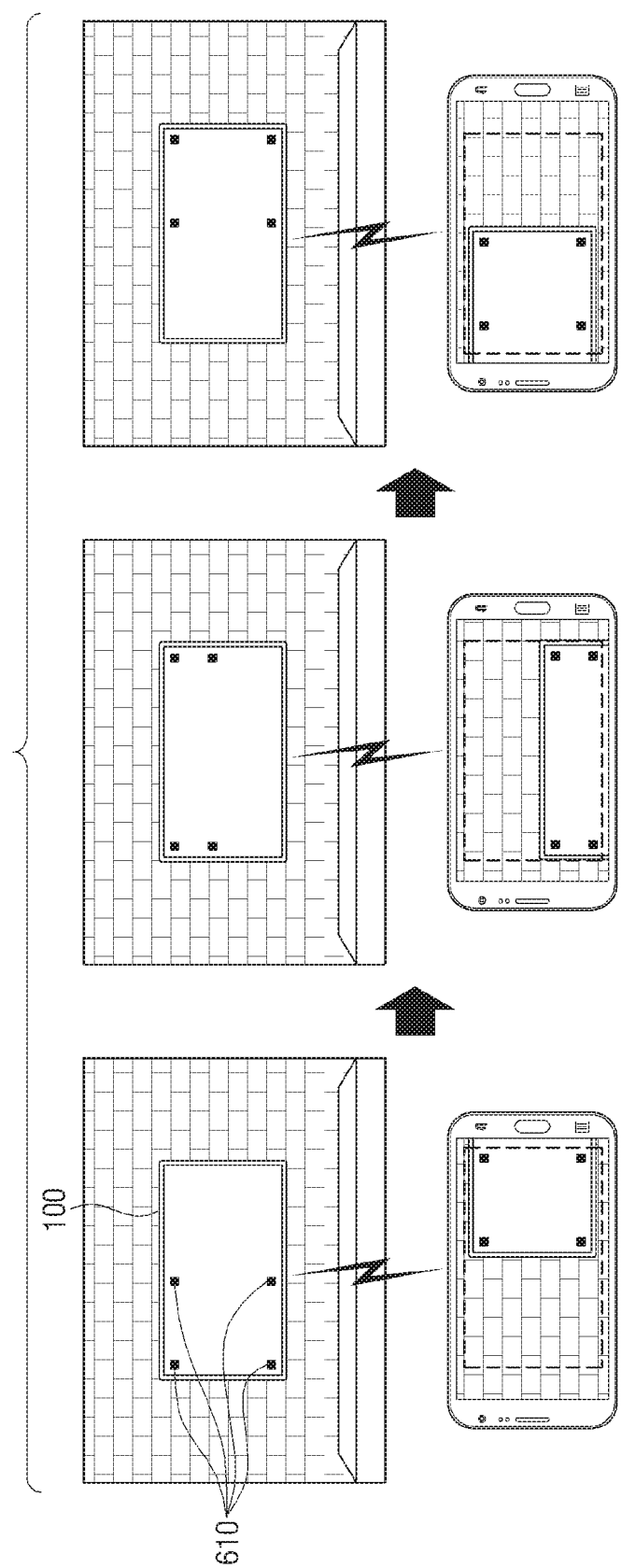

ELECTRONIC DEVICE AND CONTROL METHOD THEREOF

CROSS-REFERENCE TO RELATED APPLICATIONS

This application is based on and claims priority under 35 U.S.C. § 119 to Korean Patent Application No. 10-2018-0088934, filed on Jul. 31, 2018, in the Korean Intellectual Property Office, U.S. Provisional Patent Application No. 62/677,917, filed on May 30, 2018, and U.S. Provisional Patent Application No. 62/677,454, filed on May 29, 2018, the disclosures of which are incorporated by reference herein in their entireties.

BACKGROUND

Field

The disclosure relates to an electronic device and a controlling method thereof, and more particularly to, an electronic device for performing image processing with respect to an image and a controlling method thereof.

The present disclosure is an artificial intelligence (AI) system which simulates functions of human brain such as recognition and determination using a machine learning algorithm, and an application thereof.

Description of Related Art

In recent years, artificial intelligence systems that implement human-level intelligence have been used in various fields. Artificial intelligence system is a system that the machine learns, determines and becomes smart, unlike the existing rule-based smart system. The more the artificial intelligence systems are used, the more the recognition rate is improved, and user's taste can be understood more accurately and thus, existing rule-based smart systems are gradually being replaced by deep learning-based artificial intelligence systems.

The artificial intelligence technology is composed of machine learning (for example, deep learning) and element technologies which utilize machine learning.

Machine learning is an algorithm technology that classifies/learns the characteristics of input data by itself. Element technology is a technology that simulates functions such as recognition and determination of human brain using machine learning algorithms such as deep learning, composed of linguistic understanding, visual understanding, reasoning/prediction, knowledge representation, motion control, etc.

Various fields in which artificial intelligence technology is applied are as follows. Linguistic understanding is a technology for recognizing, applying/processing human language/characters and includes natural language processing, machine translation, dialogue system, question & answer, speech recognition/synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge/probability based inference, optimization prediction, preference-based planning, and recommendation. Knowledge representation is a technology for automating human experience information into knowledge data, including knowledge building (data generation/classification) and knowledge management (data utilization). The motion control is a technique for controlling the autonomous running of the vehicle and the motion of the robot, including motion control (navigation, collision, driving), operation control (behavior control), and the like).

When the background is photographed on a TV in a display environment such as an ordinary home or an office, the luminance distribution of an image may not be uniform depending on the angle and position due to the influence of external lighting.

If an image with uneven luminance distribution is displayed on a TV without correction, an image displayed on the TV is different from that of the background when the lighting changes or the position changes, thereby reducing the effect of the TV displaying the background.

Accordingly, there is a need to correct an image having an uneven luminance distribution to an image having a uniform luminance distribution.

SUMMARY

Exemplary embodiments of the present disclosure overcome the above disadvantages and other disadvantages not described above. Also, the present disclosure is not required to overcome the disadvantages described above, and an embodiment may not overcome any of the problems described above.

Provided is an electronic device which corrects luminance of an image of which luminance is not uniform due to lighting, so that the luminance is corrected in an uniform manner, and a control method thereof.

In accordance with an aspect of the disclosure, there is provided an electronic device including: a storage; and a processor configured to: identify, based on a luminance value of each pixel included in a global area of an image stored in the storage, a first cumulative distribution of the global area, identify, based on a luminance value of each pixel included in a local area of the image, a second cumulative distribution of the local area, correct the luminance value of each pixel included in the local area based on the first cumulative distribution and the second cumulative distribution to generate a corrected luminance value of each pixel included in the local area, and generate a corrected image signal based on the corrected luminance value of each pixel included in the local area.

The processor may be further configured to: identify a first global luminance value corresponding to a first ratio with respect to a first total cumulative pixel number in the first cumulative distribution, identify a first local luminance value corresponding to the first ratio with respect to a second total cumulative pixel number in the second cumulative distribution, identify a correction function to correct the luminance value of each pixel included in the local area based on the first global luminance value and the first local luminance value, and generate the corrected image signal based on the correction function.

The processor may be further configured to: identify a second global luminance value corresponding to a second ratio with respect to the first total cumulative pixel number in the first cumulative distribution, identify a second local luminance value corresponding to the second ratio with respect to the second cumulative distribution, and identify the correction function to correct the luminance value of each pixel included in the local area based on the first global luminance value, the first local luminance value, the second global luminance value and the second local luminance value.

The processor may be further configured to: based on the luminance value of each pixel included in the local area being corrected, update the first cumulative distribution based on the corrected luminance value of each pixel included in the local area, identify a third cumulative distribution with respect to another local area based on a luminance value of each pixel included in the other local area of the image, and correct the luminance value of each pixel included in the other local area based on the first cumulative distribution and the third cumulative distribution.

The processor may be further configured to: identify the first cumulative distribution by identifying a number of pixels having a luminance value less than or equal to each of a plurality of luminance values in the global area of the image, and identify the second cumulative distribution by identifying a number of pixels having a luminance value less than or equal to each of the plurality of luminance values in the local area of the image.

The processor may be further configured to: correct a luminance value of a pixel included in the local area to a third luminance value based on the luminance value being less than or equal to a first threshold value, and correct a luminance value of a pixel included in the local area to a fourth luminance value based on the luminance value being less greater or equal to a second threshold value.

The processor may be further configured to: identify at least one from among a type of the image and a capturing environment of the image based on a classification model stored in the storage, and correct the luminance value of each pixel included in the local area based on at least one from among the type of the image and the capturing environment of the image. The classification model may learn and acquire a plurality of sample images and information corresponding to each of the plurality of sample images through an artificial intelligence algorithm.

The processor may be further configured to identify the capturing environment of the image based on at least one from among a lighting type and a lighting position of the capturing environment.

The processor may be further configured to identify the local area based on a global luminance distribution of the global area of the image.

The electronic device may further include a display, and the processor may be further configured to control the display based on the corrected image signal.

In accordance with an aspect of the disclosure, there is provided a method of controlling an electronic device, the method including: identifying, based on a luminance value of each pixel included in a global area of an image stored in a storage, a first cumulative distribution of the global area; identifying, based on a luminance value of each pixel included in a local area of the image, a second cumulative distribution of the local area; correcting the luminance value of each pixel included in the local area based on the first cumulative distribution and the second cumulative distribution to generate a corrected luminance value of each pixel included in the local area; and generating a corrected image signal based on the corrected luminance value of each pixel included in the local area.

The correcting may include: identifying a first global luminance value corresponding to a first ratio with respect to a first total cumulative pixel number in the first cumulative distribution; identifying a first local luminance value corresponding to the first ratio with respect to a second total cumulative pixel number in the second cumulative distribution; identifying a correction function to correct the luminance value of each pixel included in the local area based on the first global luminance value and the first local luminance value; and generating the corrected image signal based on the correction function.

The correcting may further include: identifying a second global luminance value corresponding to a second ratio with respect to the first total cumulative pixel number in the first cumulative distribution; and identifying a second local luminance value corresponding to the second ratio with respect to the second cumulative distribution. The identifying the correction function may be based on the first global luminance value, the first local luminance value, the second global luminance value and the second local luminance value.

The method may further include: based on the luminance value of each pixel included in the local area being corrected, updating the first cumulative distribution based on the corrected luminance value of each pixel included in the local area; identifying a third cumulative distribution with respect to another local area based on a luminance value of each pixel included in the other local area of the image; and correcting the luminance value of each pixel included in the other local area based on the first cumulative distribution and the third cumulative distribution.

The identifying the first cumulative distribution may include: identifying the first cumulative distribution by identifying a number of pixels having a luminance value less than or equal to each of a plurality of luminance values in the global area of the image; and identifying the second cumulative distribution by identifying a number of pixels having a luminance value less than or equal to each of the plurality of luminance values in the local area of the image.

The correcting may include: correcting a luminance value of a pixel included in the local area to a third luminance value based on the luminance value being less than or equal to a first threshold value; and correcting a luminance value of a pixel included in the local area to a fourth luminance value based on the luminance value being less greater or equal to a second threshold value.

The may further include: identifying at least one from among a type of the image and a capturing environment of the image based on a classification model stored in the storage; and correcting the luminance value of each pixel included in the local area based on at least one from among the type of the image and the capturing environment of the image. The classification model may learn and acquire a plurality of sample images and information corresponding to each of the plurality of sample images through an artificial intelligence algorithm.

The method may further include identifying the capturing environment based on at least one from among a lighting type and a lighting position of the capturing environment.

The method may further include identifying the local area based on a global luminance distribution of the global area of the image.

The method may further include controlling a display of the electronic device based on the corrected image signal.

In accordance with an aspect of the disclosure, there is provided a device including: a display interface; and a processor configured to: control the display interface based on an image; identify a plurality of local areas of the image; identify, based on a luminance value of each pixel in included in a global area of the image, a first cumulative distribution of the global area; identify, based on a luminance value of each pixel included in a first local area from among the plurality of local areas of the image, a second cumulative distribution of the first local area; correct the luminance value of each pixel included in the local area based on the first cumulative distribution and the second cumulative distribution to generate a corrected luminance value of each pixel included in the first local area; update the image based on the corrected luminance value of each pixel included in the first local area; identify, based on a luminance value of each pixel included in a second local area from among the plurality of local areas of the image, a third cumulative distribution of the second local area; and update the image based on the corrected luminance value of each pixel included in the second local area.

The may further include a communication interface, and the processor may be further configured to: control the communication interface to transmit a command to a user terminal that causes the user terminal to execute a camera application; receive, from the user terminal, a notification indicating that the camera application is executed; control the display interface to display a guide image; receive, from the user terminal, a captured image of the guide image and background; and update the image based on the captured image received from the user terminal.

The processor may be further configured to: receive an editing command from the user terminal; and update the image based on the editing command received from the user terminal.

The device may further include an illumination sensor, and the processor may be further configured to update the image based on an illumination signal generated by the illumination sensor.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 6A, 6B, 6C and 6D are views to describe a function for user convenience according to various embodiments.

DETAILED DESCRIPTION

Hereinafter, embodiments will be described in detail with reference to the drawings. In the following description, known configurations may be omitted. In addition, the following embodiments may be modified into various other forms, and the scope of the technical spirit of the present disclosure is not limited to the following examples. Rather, these embodiments are provided so that the present disclosure will be more thorough and complete, and will fully convey the scope of the technical spirit of the present disclosure to those skilled in the art.

Terms used in the present specification will be briefly described and the present disclosure will be described in detail.

As used herein, the terms "1st" or "first" and "2nd" or "second" may use corresponding components regardless of importance or order and are used to distinguish one component from another without limiting the components.

As used herein, expressions such as "at least one from among." when preceding a list of elements, modify the entire list of elements and do not modify the individual elements of the list. For example, the expression. "at least one from among a, b, and c," should be understood as including only a, only b, only c, both a and b, both a and c, both b and c, or all of a, b, and c.

Hereinbelow, various embodiments of the present disclosure will be described in greater detail using the attached drawings.

Figure 1A:
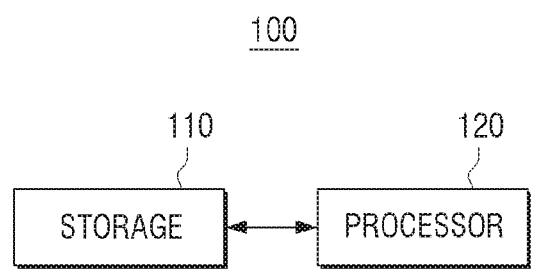
FIG. 1A is a block diagram illustrating a configuration of an electronic device according to an embodiment.

FIG. 1A is a block diagram illustrating a configuration of an electronic device according to an embodiment.

An electronic device 100 may be a device which performs image processing of an image. For example, the electronic device 100 may be a device which changes a pixel value of a pixel included in an image.

The electronic device 100 may be a device which provides a corrected image to an external display device such as a set-top box (STB), a server, a Blu-ray disc (BD) player, a disc player, and a streaming box. Herein, an image can be prestored in the electronic device 100 or received from outside.

Alternatively, the electronic device 100 may include a display such as a desktop PC, a notebook, a smart phone, a tablet PC, a TV, a digital camera, an MP3 player, a PMP, a cellular phone, a smart glasses, a smart watch, navigation, or may be an electronic device that displays directly through a display. However, the present disclosure is not limited thereto, and the electronic device 100 may be any device capable of performing image processing on an image.

According to FIG. 1A, the electronic device 100 includes a storage 110 and a processor 120.

The storage 110 may store an image. For example, the storage 110 may store an image that is photographed by a camera.

In addition, the storage 110 may further store an image classification model. The image classification model is a model acquired by learning a plurality of sample images and information respectively corresponding to each of the sample images through an algorithm. This will be described later.

The storage 110 may be implemented as a hard disk, a non-volatile memory, a volatile memory, or the like, and any configuration may be used as long as it is capable of storing data.

The processor 120 controls overall operations of the electronic device 100.

According to one embodiment, the processor 120 may be implemented as a digital signal processor (DSP), a microprocessor, or a Time Controller (TCON), but is not limited thereto. The processor may include one or more of a central processing unit (CPU), a microcontroller unit (MCU), a micro processing unit (MPU), a controller, an application processor (AP), a communication processor (CP), or an Advanced RISC Machine (ARM) processor. The processor 120 may be implemented as a system on chip (SoC), a large scale integration (LSI) with a processing algorithm embedded therein, or as field programmable gate array (FPGA).

The processor 120 may obtain a first cumulative distribution for a global area based on the luminance value of each pixel included in the global area of the image stored in the storage 110. For example, the processor 120 may acquire the number of pixels up to a luminance value of 255 by obtaining the number of pixels of which the luminance value is 0 and obtaining the number of pixels of which the luminance value is 1, from among pixels included in the global area of an image.

The processor 120 may accumulate the number of pixels having a luminance value less than or equal to each luminance value from 0 to 255. For example, the processor 120 may first identify the number of pixels having a luminance value of 0 or less. Next, the processor 120 may identify the number of pixels having a luminance value of 1 or less. The processor 120 may subsequently identify the number of pixels having a luminance value of each value or less until the maximum luminance value is reached. For example, the processor may identify the number of pixels having a luminance value of 254 or less, and then the number of pixels having a luminance value of 255 or less. In this way, the processor 120 may obtain a first cumulative distribution. That is, the first cumulative distribution may include a cumulative number of pixels per luminance value.

However, the present disclosure is not limited thereto, and the processor 120 may omit the operation of acquiring the number of pixels having a specific luminance value among the pixels included in the global area of the image. That is, the processor 120 may obtain the first cumulative distribution in such a manner that it immediately acquires the number of pixels below a certain luminance value among the pixels included in the global area of the image.

Here, the global area of the image means the whole area of the image, and the local area of the image, which will be described later, means a part of the image.

The processor 120 may obtain a second cumulative distribution for the local area based on the luminance value of each pixel included in the local area of the image. The method of obtaining the second cumulative distribution is similar to the method of obtaining the first cumulative distribution.

That is, the processor 120 may obtain the first cumulative distribution by identifying the number of pixels having a luminance value that is less than or equal to each of a plurality of luminance values in a global area of an image and obtain the second cumulative distribution by identifying the number of pixels having a luminance value that is less than or equal to each of a plurality of luminance values in a local area of an image.

The processor 120 may correct the luminance value of each pixel included in the local area based on the first cumulative distribution and the second cumulative distribution.

Specifically, the processor 120 may obtain a first luminance value corresponding to a cumulative number of pixels of a first ratio for the total cumulative number of pixels in each of a first cumulative distribution and a second cumulative distribution, and obtain a correction function for correcting the luminance value of each pixel included in the local area based on the first luminance value obtained in each of the first cumulative distribution and the second cumulative distribution.

That is, the processor 120 may obtain the correspondence relationship of the first luminance value in the first cumulative distribution and the first luminance value in the second cumulative distribution. If one correspondence is used, the processor 120 can further use the case where the luminance value is zero. That is, the processor 120 can obtain a linear correction function by further considering the correspondence relationship between the luminance value zero in the first cumulative distribution and the luminance value zero in the second cumulative distribution. The processor 120 may input the current pixel value in the local area into the correction function and obtain the output as a corrected pixel value.

Alternatively, the processor 120 may obtain a second luminance value corresponding to a cumulative number of pixels of a second ratio for the total cumulative number of pixels in each of the first cumulative distribution and the second cumulative distribution, and obtain a correction function for correcting the luminance value of each pixel included in the local area based on the first luminance value and the second luminance value obtained in each of the first cumulative distribution and the second cumulative distribution.

That is, the processor 120 may obtain the linear correction function using the first correspondence relation of the first luminance value in the first cumulative distribution and the first luminance value in the second cumulative distribution, and the second correspondence relation of the second luminance value in the first cumulative distribution and the second luminance value in the second cumulative distribution.

Alternatively, the processor 120 may obtain the correction function in a curved shape in further consideration of the correspondence relation between the luminance value zero in the first cumulative distribution and the luminance value zero in the second cumulative distribution, in addition to the first correspondence relation and the second correspondence relation. In this case, the processor 120 may obtain the correction function in a curved shape using algorithm of a cubic equation.

As the number of correspondence relationships used to obtain the correction function increases, the luminance distribution of the image may become uniform. Here, the number of correspondence relationships may be input by the user, but the processor 120 may determine the number according to the image.

For example, the processor 120 can acquire a correction function using a larger number of correspondence relationships in a case when the degree of non-uniformity of the luminance distribution of the image is high, than a case when the degree of non-uniformity of the luminance distribution of the image is low.

Alternatively, the processor 120 may obtain the number of correspondence relationships through an artificial intelligence algorithm, which will be described later.

In the above description, it has been described that the correction function is obtained and the local area of the image is corrected. However, the present disclosure is not limited thereto.

For example, the processor 120 may convert the total cumulative number of pixels to 100 in each of the first cumulative distribution and the second cumulative distribution, and convert the cumulative number of pixels per luminance value to a ratio of 100. The processor 120 may then correct the luminance value of the pixel in the local area such that the second cumulative distribution is of the same form as the first cumulative distribution.

The processor 120 may identify the number of local areas based on the luminance distribution of the global area of the image. For example, the processor 120 may increase the number of local areas when the luminance distribution of the global area of the image is distributed over a predetermined luminance range. That is, the processor 120 may divide the image into smaller portions to obtain a higher number of local areas or larger portions to obtain a smaller number of local areas.

In addition, the processor 120 may divide the image into local areas of different sizes. For example, the local area in the dark portion of the image may be larger than the local area in the bright portion of the image.

The electronic device 100 may further include a display, and the processor 120 may control the display to display an image with a corrected luminance value.

When the luminance value of each pixel included in the local area is corrected, the processor 120 updates the first cumulative distribution based on the corrected luminance value, obtain the third cumulative distribution on another local area based on the luminance value of each pixel included in another local area, and corrects a luminance value of each pixel included in another local area based on the updated first cumulative distribution and the third cumulative distribution.

That is, the processor 120 may update the first cumulative distribution as the luminance value of each pixel included in the local area is corrected, and correct the luminance value of each pixel included in the other local area based on the updated first cumulative distribution.

With this method, the correction can be performed repeatedly. For example, even if the image is divided into four areas and the correction for the first to fourth local areas is sequentially completed, the first cumulative distribution is updated and there may be a difference between the cumulative distribution of the first local area and the updated first cumulative distribution. Accordingly, correction may be performed again from the first local area.

That is, this method can be applied when the computing ability of the processor 120 is sufficient or when an image having a high level of uniform luminance distribution is obtained.

The processor 120 may also terminate the correction if the first cumulative distribution and the second cumulative distribution meet a predetermined condition to prevent infinite repetition of the correction.

For example, the processor 120 may obtain a first luminance value corresponding to a cumulative number of pixels of a first ratio for a total cumulative number of pixels in each of a first cumulative distribution and a second cumulative distribution, and terminate the correction if the difference between the first luminance value obtained in the first cumulative distribution and the first luminance value obtained in the second cumulative distribution is within a predetermined value.

If the luminance value of the pixel included in the local area of the image is less than or equal to the predetermined first threshold value, the processor 120 may correct the luminance value to the third luminance value, and if the luminance value of the pixel included in the local area of the image is greater than or equal to the preset second threshold value, may correct the luminance value to the fourth luminance value.

For example, if the luminance value of the pixel included in the local area of the image is 20 or less, the processor 120 corrects the luminance value to 25, and if the luminance value of the pixel included in the local area of the image is 235 or more, the processor may correct the luminance value to 230.

This saturation behavior can minimize noise.

The processor 120, on the other hand, may obtain at least one of the type of image and the imaging environment of the image based on the image classification model stored in the storage 110, and based on at least one of the acquired image type and the imaging environment of the image, may correct the luminance value of each pixel included in the local area.

Here, the image classification model can be obtained by learning information corresponding to each of the plurality of sample images and the plurality of sample images through the artificial intelligence algorithm. The image capture environment may then include at least one of an illumination type and an illumination location of the environment in which the image was taken.

That is, the processor 120 may supplement the image correction operation based on the image classification model learned through the artificial intelligence algorithm. For example, the processor 120 may obtain a number of correspondence relationships for generating a correction function based on the image classification model. Alternatively, the processor 120 may obtain a ratio to obtain a correspondence relationship based on the image classification model. Alternatively, the processor 120 may obtain a threshold value and a luminance value to be used for the saturation operation. Alternatively, the processor 120 may determine the number of local areas based on the image classification model.

However, the present disclosure is not limited thereto, and the processor 120 may correct each of the plurality of first sample images through a correction function to obtain a plurality of second sample images, and the second sample corresponding to each of the plurality of first sample images through artificial intelligence algorithms to obtain an image correction model.

In this case, the processor 120 may obtain an output image in which the luminance value of the image is made uniform based on the image correction model.

Figure 1B:
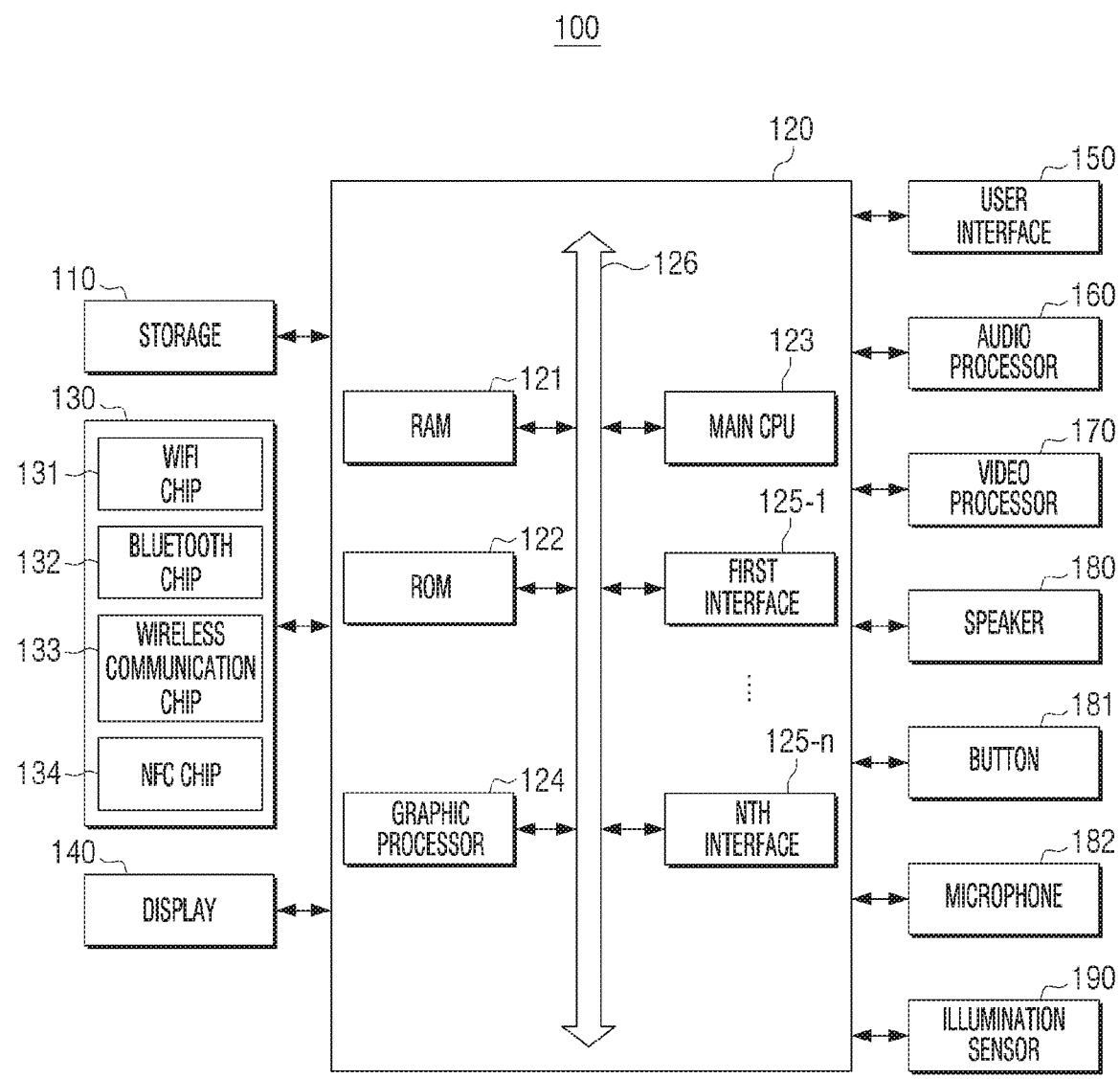
FIG. 1B is a block diagram illustrating an example of a detailed configuration of an electronic device.

FIG. 1B is a block diagram illustrating an example of a detailed configuration of the electronic device 100. As shown in FIG. 1B, the electronic device 100 includes the storage 110, the processor 120, the communication interface 130, the display 140, a user interface 150, an audio processor 160, a video processor 170, a speaker 180, a button 181, a microphone 182, and an illumination sensor 190. Details of the components shown in FIG. 1B that overlap with the components shown in FIG. 1A will not be described in detail.

The processor 120 generally controls the operation of the electronic device 100 using various programs stored in the storage 110.

Specifically, the processor 120 includes a random-access memory (RAM) 121, a read-only memory (ROM) 122, a main CPU 123, a graphics processor 124, first through n interfaces 125-1 through 125-n, and a bus 126.

The RAM 121, ROM 122, the main CPU 123, the graphic processor 124, the first to n$^{th}$ interface 125-1~125-n, and the like can be connected with each other through the bus 126.

The first to n$^{th}$ interface 125-1 to 125-n are connected with the aforementioned various components. One of the interfaces may be a network interface that is connected to an external device through network.

The main CPU 123 accesses the storage 110 and performs booting using the operating system (O/S) stored in the storage 110. Then, the main CPU performs various operations using various programs stored in the storage 110.

The ROM 122 stores a command set for booting the system and the like. When the turn-on command is input to supply power, the main CPU 123 copies the O/S stored in the storage 110 to the RAM 121 according to the command set stored in the ROM 122, and executes the O/S to boot the system. When the booting is completed, the main CPU 123 copies various application programs stored in the storage 110 to the RAM 121, executes the application program copied to the RAM 121, and performs various operations.

The graphic processor 124 may be a hardware graphic process, and may include an operation unit and a rendering unit. The graphic processor 124 generates a screen including various objects such as an icon, an image, and a text using the operation unit and the rendering unit. The operation unit calculates an attribute value such as a coordinate value, a shape, a size, and a color to be displayed by each object according to the layout of the screen based on the received control command. The rendering unit generates screens of various layouts including the objects based on the attribute values calculated by the operation unit. The screen generated in the rendering unit is displayed within the display area of the display 140.

The operation of the processor 120 described above may be performed by a program stored in the storage 110.

The storage 110 stores various data such as an O/S software module for driving the electronic device 100, an image module, an image processing module, and the like.

The communication interface 130 may be a transceiver (transmitter and receiver) or communication interface to perform communication with various types of external devices according to various types of communication methods. The communication interface 130 includes a Wi-Fi chip 131, a Bluetooth chip 132, a wireless communication chip 133, and an NFC chip 134, and the like. The processor 120 performs communication with various external devices using the communication interface 130.

The Wi-Fi chip 131 and the Bluetooth chip 132 communicate using the WiFi method and the Bluetooth method, respectively. When the Wi-Fi chip 131 or the Bluetooth chip 132 is used, various connection information such as a service set identifier (SSID) and a session key may be transmitted and received first, and communication information may be used to transmit and receive various information. The wireless communication chip 133 refers to a chip that performs communication according to various communication standards such as IEEE, Zigbee, 3rd Generation (3G), Third Generation Partnership Project (3GPP), Long Term Evolution (LTE), and Near-Field Communication (NFC), NFC means uses, for example, a 13.56 MHz band among various RF-ID frequency bands such as 135 kHz, 13.56 MHz, 433 MHz, 860 to 960 MHz, 2.45 GHz, or the like.

The communication interface 130 can perform unidirectional communication or bidirectional communication with an external device. When performing unidirectional communication, the communication interface 130 can receive an image from an external device. When performing bidirectional communication, the communication interface 130 may receive the image from the external device and transmit the corrected image to the external device.

The display 140 may be implemented in various forms such as a liquid crystal display (LCD), an organic light emitting diode (OLED) display, and a plasma display panel (PDP). The display 140 may also include a driving circuit, a backlight, etc., which may be implemented in the form of an a-si thin-film-transistor (TFT), a low temperature poly silicon (LTPS) TFT, or an organic TFT (OTFT). The display 140 may be implemented as a touch screen in combination with the touch sensor.

The user interface 150 receives various user interactions. Here, the user interface 150 may be implemented in various forms according to an embodiment of the electronic device 100. For example, the user interface 150 may be a button provided on the electronic device 100, a microphone for receiving a user's voice, a camera for detecting user's motion, or the like. Alternatively, when the electronic device 100 is implemented as a touch-based electronic device, the user interface 150 may be implemented as a touch screen having a mutual layer structure with the touch pad. In this case, the user interface 150 can be used as the display 140 described above.

The audio processor 160 is a component that performs processing on audio data. In the audio processor 160, various processes such as decoding and amplification of audio data, noise filtering, and the like may be performed.

The video processor 170 is a component that performs processing on video data. The video processor 170 may perform various image processing such as decoding, scaling, noise filtering, frame rate conversion, resolution conversion, and the like on the video data.

The speaker 180 is a component for outputting various kinds of audio data processed by the audio processor 160, as well as various kinds of notification sounds and voice messages.

The button 181 may be various types of buttons such as a mechanical button, a touch pad, a wheel, etc., formed in an area such as a front surface portion, a side surface portion, and a back surface portion of the outer surface of the main body of the electronic device 100.

The microphone 182 is a component to receive a user's voice or other sound to convert the sound to audio data.

By the above-described method, the processor 120 may correct the luminance distribution of an image in a uniform manner.

An operation of the electronic device 100 will be described in a greater detail through drawings.

Figure 2A:
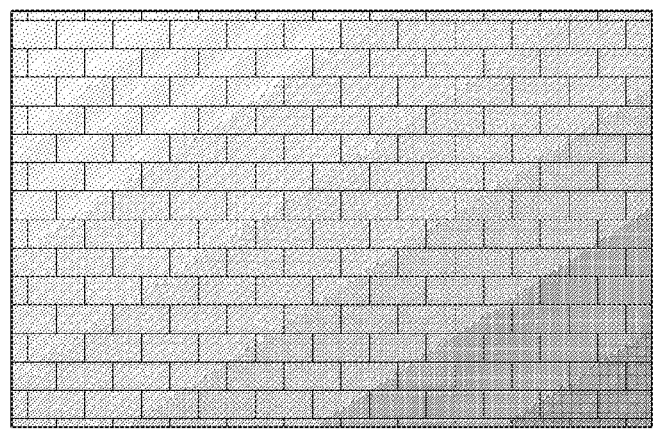
FIGS. 2A, 2B and 2C are views to describe a first cumulative distribution according to an embodiment.
Figure 2B:
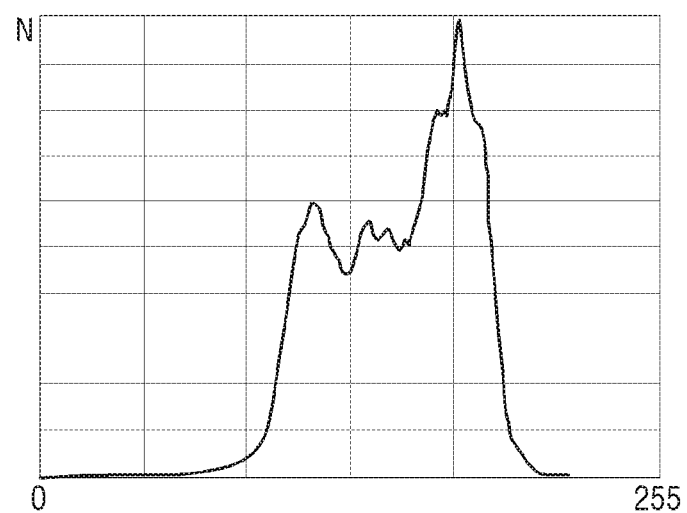
Figure 2C:
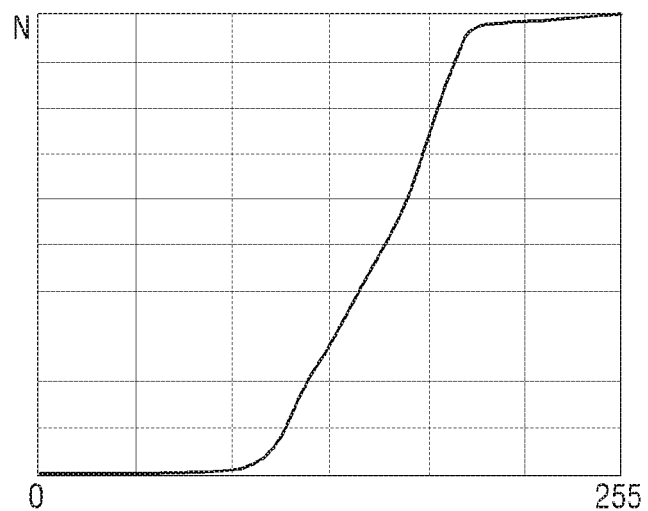

FIGS. 2A, 2B and 2C are views to describe a first cumulative distribution according to an embodiment.

In an image, luminance distribution may not be uniform. In addition, an image may be an image which captures wallpaper of a backside of the electronic device 100.

For example, as illustrated in FIG. 2A, lighting can be positioned at a left side of the image and a left side of the image can be brighter than the right side. In addition, an upper side of the image can be brighter than a lower side of the image.

The processor 120 may then obtain a distribution of the luminance values of each pixel included in the global area of the image. For example, the processor 120 may obtain a distribution of luminance values from 0 to 255, as shown in FIG. 2B. For example, the processor 120 may identify the number of pixels with a luminance value of 30 in the global area of the image, and store the number of identified pixels in the storage 110 by matching the number of identified pixels with respect to the luminance value.

In FIG. 2B, it is described that the luminance value ranges from 0 to 255. However, the present disclosure is not limited thereto, and the image may have a luminance value in any range. Also, the graph of FIG. 2B is shown for convenience of description, and the processor 120 may not obtain the graph as shown in FIG. 2B. For example, the processor 120 may identify the number of pixels for each of the luminance values in the global area of the image and store it in the storage 110.

Alternatively, the processor 120 may store the luminance values 0 to 255 and the number of pixels corresponding to each of the luminance values in the storage 110. The processor 120 may then update the number of pixels corresponding to the luminance value stored in the storage 110 according to the luminance value of each pixel included in the global area of the image.

In the above description, it has been described that the processor 120 stores the luminance value distribution in the storage 110, but the present disclosure is not limited thereto. For example, the processor 120 may include a configuration such as a register file, a cache memory, and the like, and may store a luminance value distribution in a register file, a cache memory, or the like inside the processor 120.

Thereafter, the processor 120 may obtain a first cumulative distribution for the global area of the image. FIG. 2C shows the first cumulative distribution.

The processor 120 may utilize the data as shown in FIG. 2B in order to obtain a first cumulative distribution. For example, the processor 120 may accumulate the number of pixels whose luminance value is 0 or less. Then, the processor 120 may accumulate the number of pixels whose luminance value is 1 or less. For example, if the number of pixels having a luminance value of 0 is 5 and the number of pixels having a luminance value of 1 is 10, the processor 120 may obtain that there are five pixels of which luminance value is 0 or below, and there are 15 pixels of which the luminance value is 1 or below.

In this way, the processor 120 can obtain a cumulative number of pixels up to a luminance value of 255. FIGS. 2B and 2C are embodiments of an image having a maximum luminance value of 255, the number of pixels having a luminance value of 255 or less may be the same as the number of all pixels included in the global area of the image.

Through the aforementioned method, the processor 120 may obtain the first cumulative distribution regarding the global area of an image.

Figure 3A:
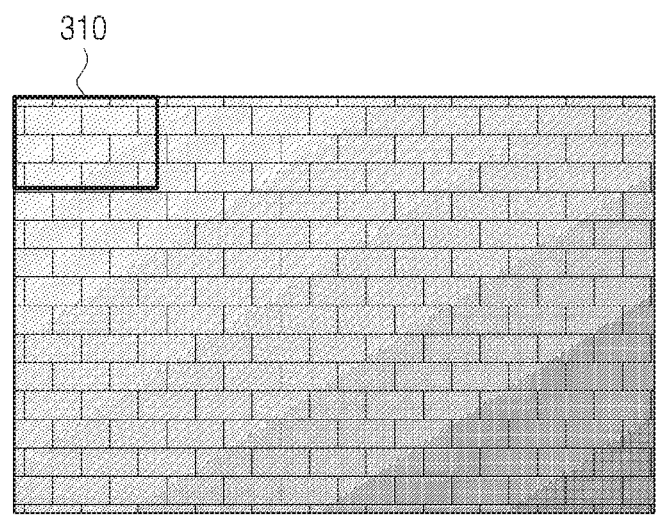
FIGS. 3A, 3B and 3C are views to describe a second cumulative distribution according to an embodiment.
Figure 3B:
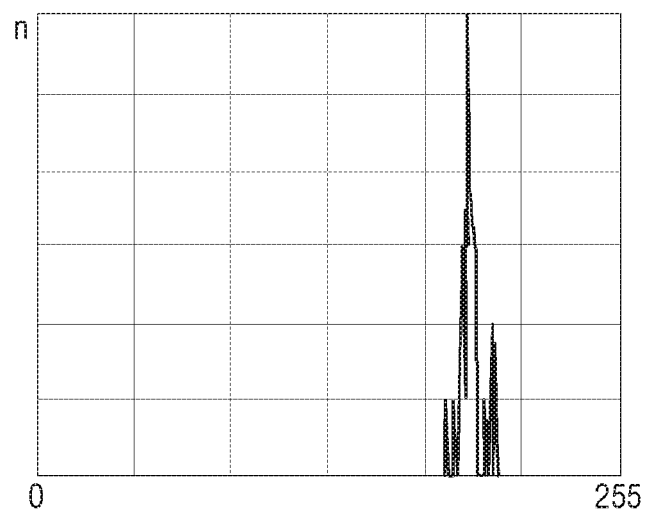
Figure 3C:
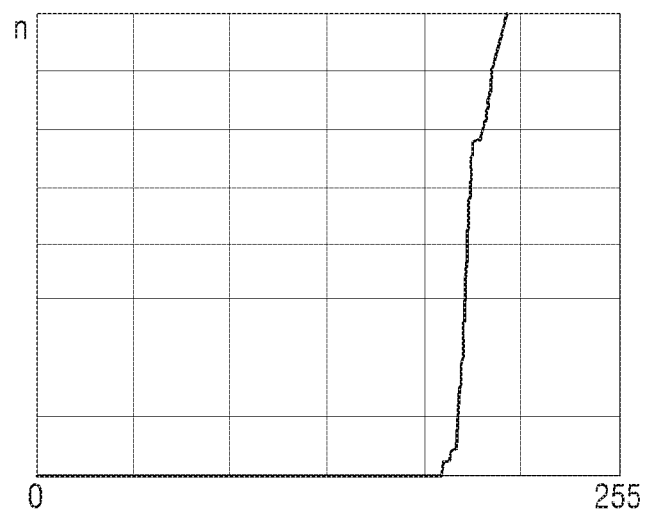

FIGS. 3A, 3B and 3C are views to describe a second cumulative distribution according to an embodiment.

The image of FIG. 3A is similar to the image of FIG. 2A, additionally identifying a local area 310. The processor 120 may obtain distribution associated with the luminance value of each pixel included in the local area 310 of the image.

FIG. 3B shows the distribution of luminance values from 0 to 255 in the local area 310. FIG. 3C shows the second cumulative distribution, and the operation of the processor 120 in FIGS. 3B and 3C is similar to the operation of the processor 120 in FIGS. 2B and 2C, but there is a difference only in the target area in the image, so redundant explanations are omitted.

Figure 4A:
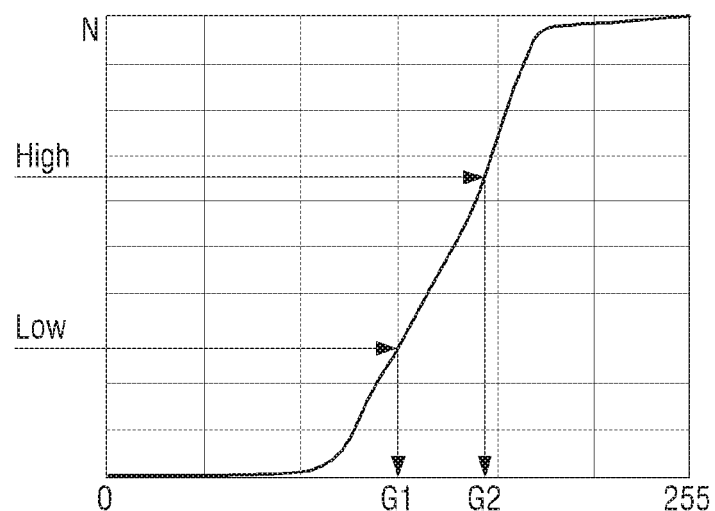
FIGS. 4A, 4B and 4C are views to describe a method of generating a correction function according to an embodiment.
Figure 4B:
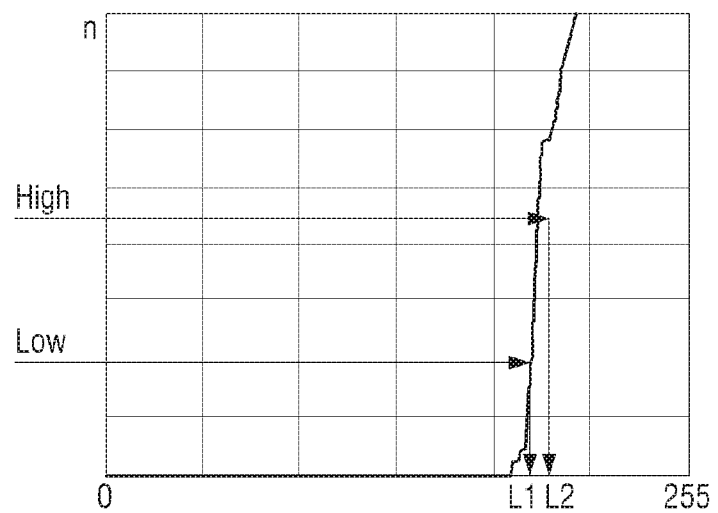
Figure 4C:
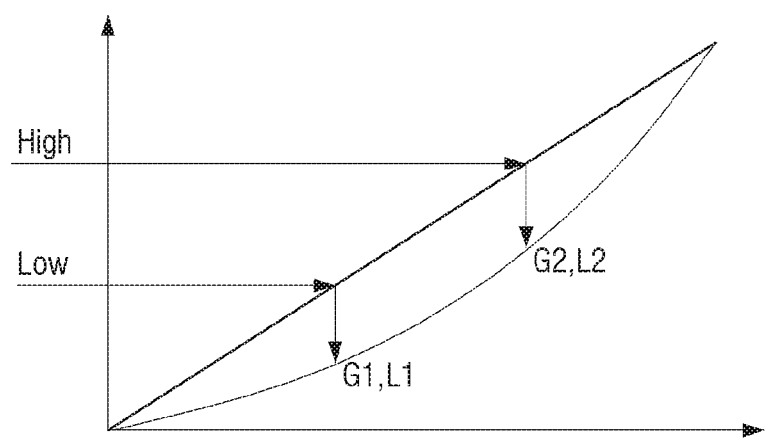

FIGS. 4A, 4B and 4C are views for describing a method of generating a correction function according to an embodiment.

First, the x-axis in FIGS. 4A and 4B represents the luminance value, and the y-axis represents the cumulative number of pixels. FIGS. 4A and 4B show the first cumulative distribution and the second cumulative distribution, respectively, and show two reference points.

The processor 120 may first obtain a first luminance value corresponding to a cumulative number of pixels of a first ratio for the total number of cumulative pixels in each of the first cumulative distribution and the second cumulative distribution to obtain a first reference point.

Because FIG. 4A is the first cumulative distribution for the global area of the image and FIG. 4B is the second cumulative distribution for the local area of the image, the maximum number of cumulative pixels of the global area may be greater than the maximum cumulative number of pixels of the local area.

For example, the maximum number of cumulative pixels in the global area may be 2000, and the maximum cumulative number of pixels in the local area may be 100. In this case, when the reference point is determined as the absolute value of the cumulative number of pixels, a problem may occur.

Thus, the processor 120 may determine the first reference point based on a ratio. For example, the processor 120 may obtain a first luminance value 120 corresponding to 600 cumulative pixel numbers which is 30% of 2000 in the first cumulative distribution, and obtain a first luminance value 180 corresponding to the 30 cumulative pixel numbers which is 30% of 100 in the second cumulative distribution. The processor 120 may use the first luminance value 120 in the first cumulative distribution and the first luminance value 180 in the second cumulative distribution as the first reference point.

The processor 120 may change the ratio and obtain an additional reference point in a similar manner. For example, the processor 120 may obtain a second luminance value 160 corresponding to 1400 cumulative pixel numbers which is 70% of 2000 in the first cumulative distribution, and obtain a second luminance value 200 corresponding to the 70 cumulative pixel numbers which is 70% of 100 in the second cumulative distribution. The processor 120 may use the second luminance value 160 in the first cumulative distribution and the second luminance value 200 in the second cumulative distribution as the second reference point.

The processor 120 may obtain a correction function based on the first reference point and the second reference point, as shown in FIG. 4C. For example, the processor 120 may obtain a cubic equation based on (0, 0), the first reference point and the second reference point, and use the obtained cubic equation as a correction function. Here, the x-axis of FIG. 4C is the current luminance value of the pixel, and the y-axis represents the corrected luminance value.

The processor 120 may correct the luminance value of each pixel included in the local area based on the obtained correction function. For example, the processor 120 may input the luminance value of each of the 100 pixels included in the local area to the correction function to obtain the corrected luminance value.

FIG. 4C represents the correction function which is convex in an X-axis direction. As the local area 310 of FIG. 3C is brighter, on average, than other areas, the luminance value can be reduced a little and the local area gets dark.

When the correction for the local area is completed, the processor 120 may acquire a second cumulative distribution for another local area, obtain a new correction function, and correct the luminance value of the other local area using the correction function.

The processor 120 may repeat this process until all the local areas are completed.

Here, the processor 120 first obtains the first cumulative distribution for the global area, and can use the first cumulative distribution as it is even if the local area is changed. However, the present disclosure is not limited thereto, and the processor 120 may update the first cumulative distribution and perform the correction for the second local area when the correction for the first local area is completed.

Figure 5:
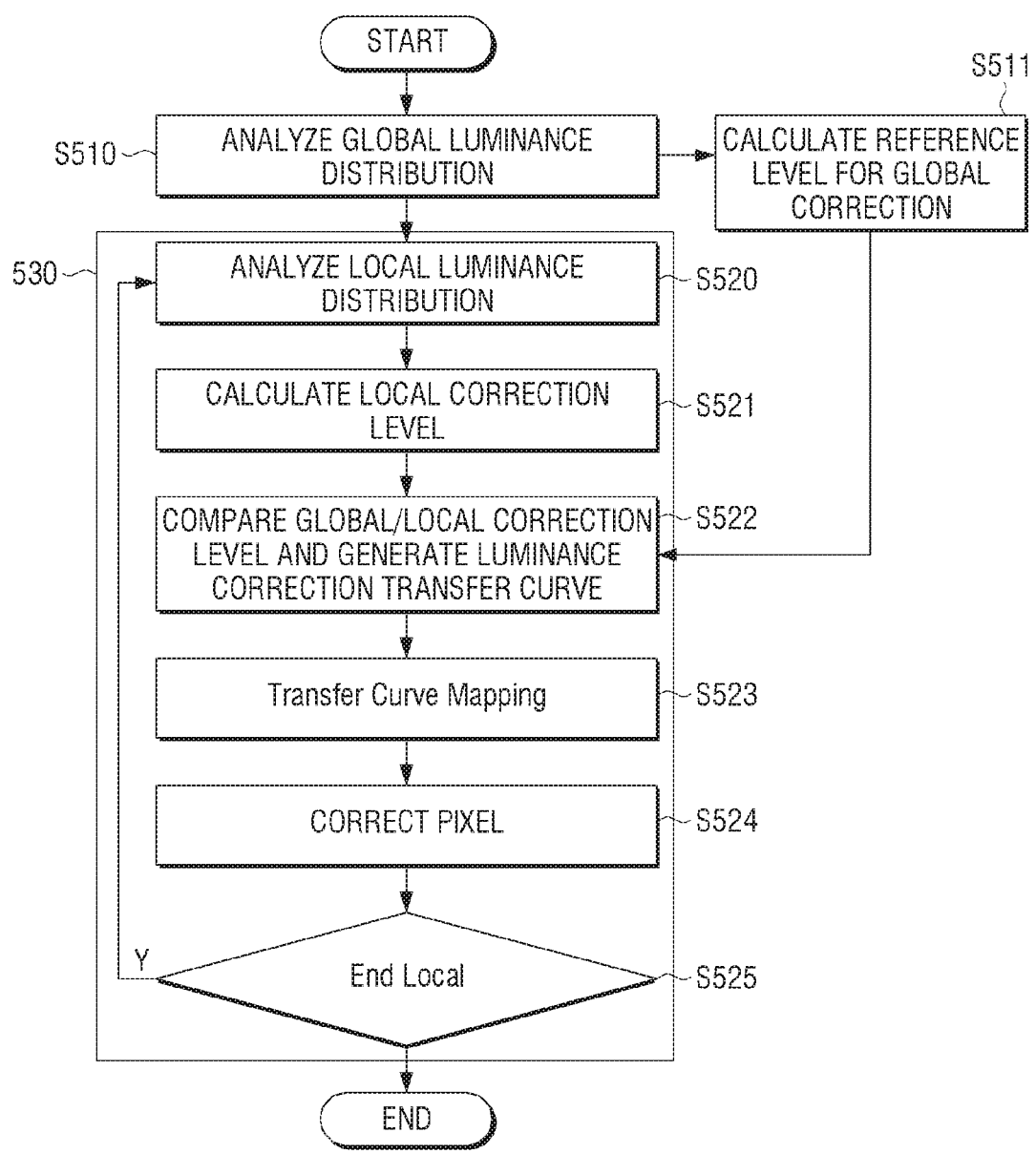
FIG. 5 is a flowchart illustrating a method for correcting a luminance value according to an embodiment.

FIG. 5 is a flowchart illustrating a method for correcting a luminance value according to an embodiment.

The processor 120 may first analyze the luminance distribution of the global area in step S510 and obtain the first cumulative distribution. Then, the processor 120 may calculate correction reference level of the global area in step S511. Here, the correction reference level may mean a ratio for setting a reference point, the number of reference points, and the like.

For example, the processor 120 may use the luminance values corresponding to the cumulative number of pixels of each of ratios of 20%, 50%, and 70% for the total cumulative number of pixels in the first cumulative distribution as a reference point.

The processor 120 may analyze the luminance distribution of the local area in step S520 to obtain the second cumulative distribution. Thereafter, the processor 120 may use the luminance values in the second cumulative distribution as reference points according to the correction reference level used in the first cumulative distribution in step S521.

The processor 120 may obtain the correction function by comparing the luminance values in the first cumulative distribution and the luminance values in the second cumulative distribution in step S522, and may map the correction function in step S523.

The processor 120 corrects the pixel based on the correction function in step S524, and if the correction of the local area is completed in step S525, the processor 120 may return to the step S520 to perform the same operation in a new local area. That is, the operation 530 of steps S520 to S525 means the operation of the processor 120 for one local area.

Once step S530 has been completed for all the local areas, the processor 120 may stop an operation of correcting the luminance value of an image.

Figure 6B:
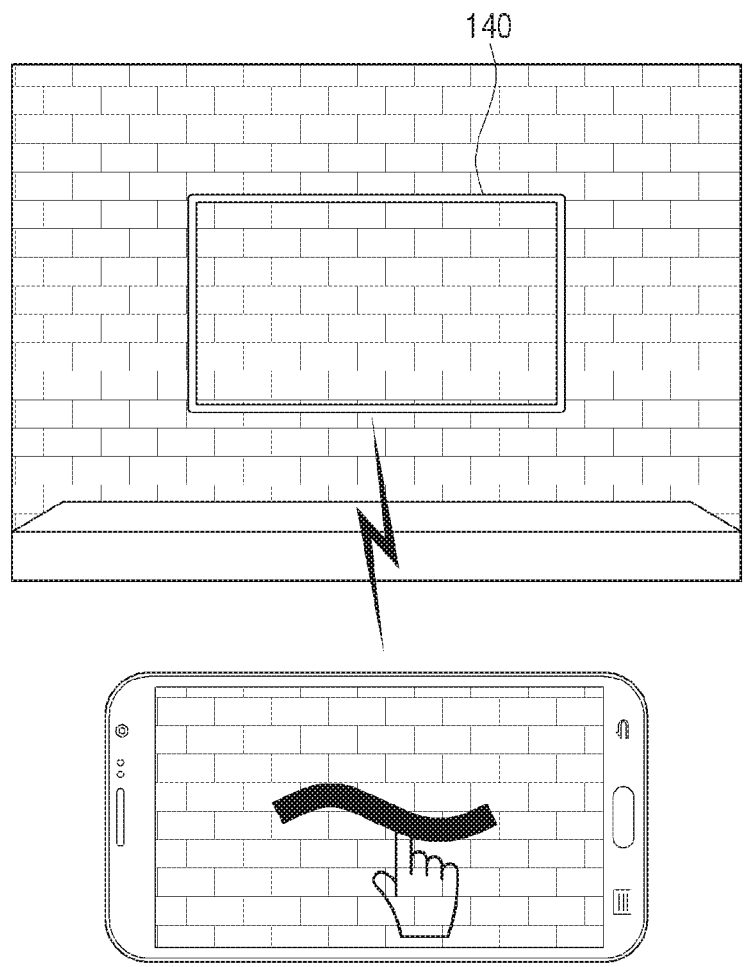
Figure 6C:
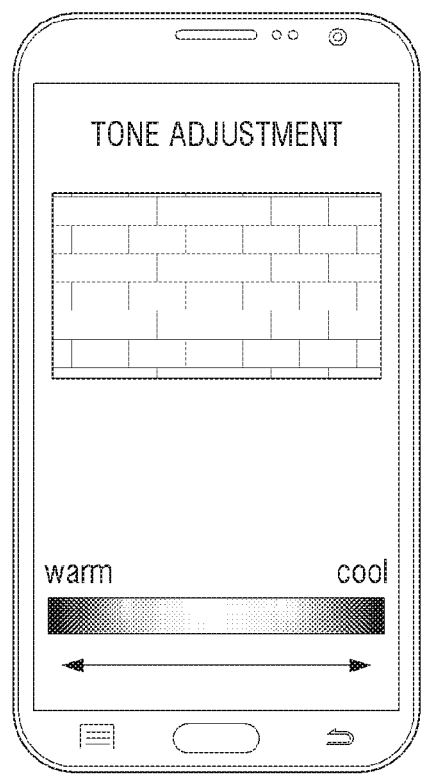

FIGS. 6A, 6B and 6C are views to describe a function for user convenience according to various embodiments.

As shown in FIG. 6A, the electronic device 100 may be mounted on a wall, and may be a display device having a display 140. The display device may communicate with a user terminal device such as a smart phone, and can guide the capturing of a back side of the display device.

For example, the display device may transmit, to the user terminal device, a command to guide capturing of an image to be used as a background, and the user terminal device may execute a camera application according to a command received from the display device.

When the display device receives the information that the camera application is executed from the user terminal device, the display device may display an image guiding the subject to be captured. For example, the display device can display an image including four points on the left side as shown in the left drawing of FIG. 6A. Alternatively, the display device may display an image including four points on the top, as shown in the middle diagram of FIG. 6A.

Alternatively, the display device may display an image including four points on the right side, as shown in the right diagram of FIG. 6A. The display device may display only one of the three images of FIG. 6A, or may sequentially display three images.

The user may manipulate the user terminal device to include the image displayed on the display device and the external area of the display device and perform capturing. For example, as illustrated in the left drawing of FIG. 6A, the user can perform capturing by changing the position of the user terminal device so that the four points included in the image are located on the right side of the display of the user terminal device.

The display device may receive the captured image from the user terminal device, and may extend the remaining area of the captured image excluding the first area including the display device to obtain the final image. For example, the display device may obtain a copy of the remaining area, and connect the remaining area and copy to obtain the final image.

The display device can generate a final image for all of the images photographed in various ways, and sequentially display the generated final images. When one of the final images is selected, the display device can correct the luminance value of the selected final image and display the final image with the corrected luminance value. The luminance value correction method may be the same as the above-described method.

Figure 6D:
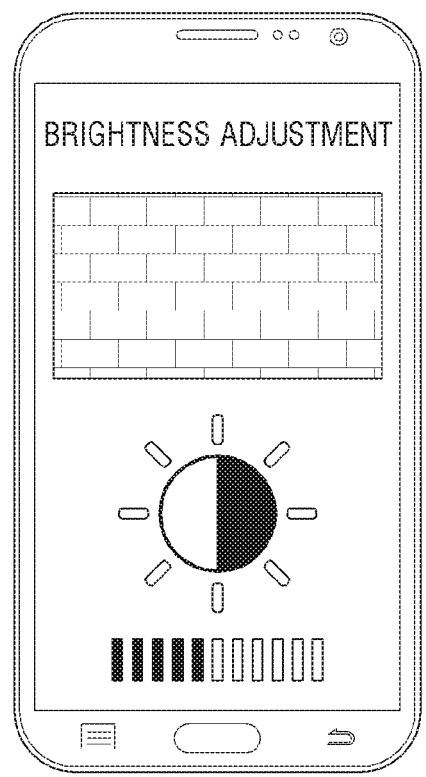

The display device may interact with a user terminal device to provide a function for editing the displayed final image. For example, as shown in FIG. 6B, the user terminal device can provide a function of editing an unnecessary space of a final image using an in-painting technique. Alternatively, the user terminal device may provide the function of adjusting the tone of the final image, as shown in FIG. 6C. Alternatively, the user terminal device may provide the function of adjusting the luminance value of the final image, as shown in FIG. 6D. The display device can edit and display the final image when an editing command is received from the user terminal device.

Figure 7A:
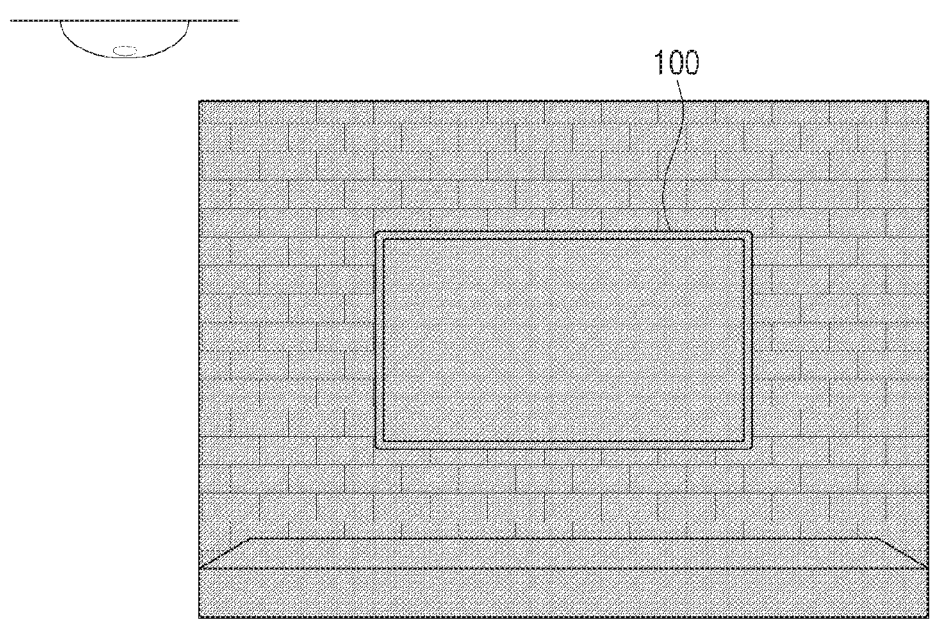
FIGS. 7A and 7B are views to describe a method for correcting a luminance value according to another embodiment.
Figure 7B:
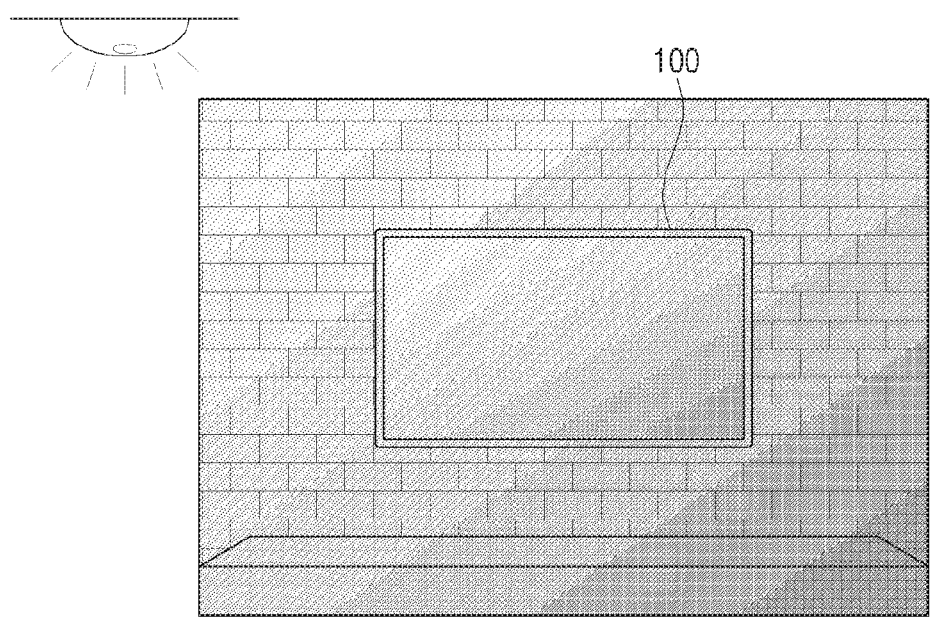

FIGS. 7A and 7B are views to describe a method for correcting a luminance value according to another embodiment.

First, the electronic device 100 may be a display device having a display 140, as shown in FIG. 7A. The electronic device 100 may also include an illumination sensor 190. The display device can display an image of which luminance value is corrected. The luminance value correction method may be the same as the above-described method. Here, the lighting around the display device may be all turned off.

Thereafter, when the illumination is turned on as shown in FIG. 7B, the display device may correct the luminance value of the image based on the brightness difference before and after the lighting is turned on, and display the corrected image.

However, the present disclosure is not limited thereto, and the display device may detect the position and brightness of the lighting, and may display and correct the image according to the detected information.

For example, as shown in FIG. 7B, when a light located at the upper left end of the display device is turned on, the display device corrects the luminance value so that the upper left end of the image becomes brighter and the lower right end of the image becomes darker.

In FIGS. 7A and 7B, it has been described that the electronic device 100 is a display device. However, the present disclosure is not limited thereto. For example, the electronic device 100 and the display device may be separately provided, and the electronic device 100 may provide an image to be displayed on the display device.

Figure 8A:
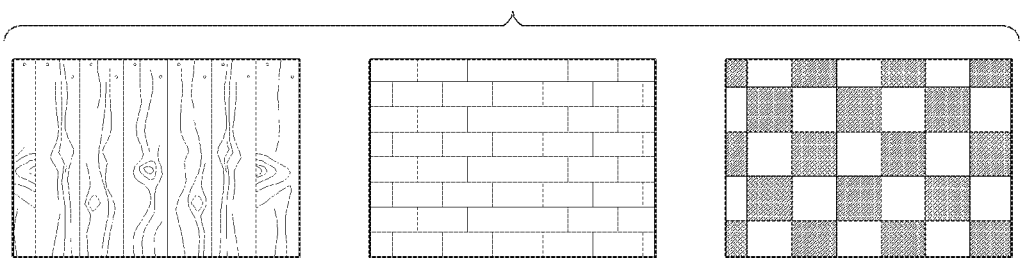
FIGS. 8A and 8B are views to describe a method of using an artificial intelligence algorithm according to an embodiment.
Figure 8B:
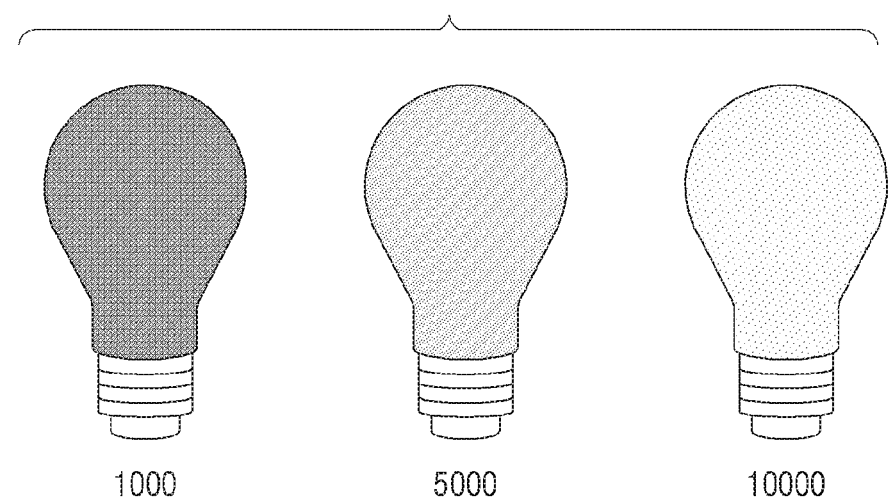

FIGS. 8A and 8B are views to describe a method of using an artificial intelligence algorithm according to an embodiment.

As shown in FIGS. 8A and 8B, the processor 120 may correct a luminance value of an image based on an image type and an image classification model in which an image capturing environment of the image is learned. Here, the image classification model can be obtained by learning information corresponding to each of the plurality of sample images and the plurality of sample images through the artificial intelligence algorithm. The image capture environment may then include at least one of a lighting type and a lighting location of the environment in which the image was captured.

For example, as illustrated in FIG. 8B, the processor 120 may identify the lighting type as a light bulb 1000 that is off, a light bulb 5000 that is dimmed, or a light bulb 10000 that is bright.

For example, the processor 120 may obtain information for luminance value correction of an image based on an image classification model. For example, the processor 120 may obtain the number of reference points, a rate for acquiring a reference point, etc., based on the image classification model.

In the above description, it has been described that the type and the capturing environment of the image are acquired through one image classification model, but the present disclosure is not limited thereto. For example, an artificial intelligence model may include an image classification model to obtain the type of image, an image classification model to obtain the lighting, and an image classification model to obtain the lighting position.

Alternatively, the processor 120 may correct the luminance value of the image using only the artificial intelligence algorithm. For example, the processor 120 may correct the luminance value of each pixel included in the image based on the image luminance value correction model. Here, the image brightness value correction model can be obtained by learning a plurality of original images before luminance value correction and a plurality of correction images whose luminance values are corrected according to the above-described method through an artificial intelligence algorithm.

The learned model as described above can be provided from an external server. The learned model provided by the external server is a learned determination model based on an artificial intelligence algorithm, for example, it may be a model based on a neural network. The learned determination model may include a plurality of weighted network nodes that may be designed to simulate the human brain structure on a computer and simulate a neuron of a human neural network. The plurality of network nodes may each establish a connection relationship so that the neurons simulate the synaptic activity of the neurons sending and receiving signals through the synapse. Also, the learned determination model may include, for example, a neural network model or a deep learning model developed from a neural network model. In the deep learning model, a plurality of network nodes are located at different depths (or layers), and may transmit and receive data according to a convolution connection relationship. Examples of learned determination models include, but are not limited to, Deep Neural Network (DNN), Recurrent Neural Network (RNN), and Bidirectional Recurrent Deep Neural Network (BRDNN).

Figure 9:
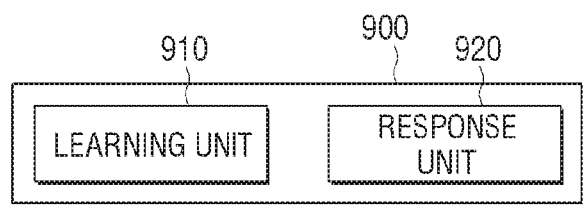
FIG. 9 is a block diagram illustrating a configuration of an external server according to an embodiment.

FIG. 9 is a block diagram illustrating a configuration of an external server 900 according to an embodiment.

Referring to FIG. 9, an external server 900 may implement at least one of a learning unit 910 and a response unit 920.

The learning unit 910 may generate or train an artificial intelligence model to correct a luminance value of an image using learning data. The learning unit 910 may generate a determination model having a determination criterion using the collected learning data.

The response unit 920 may obtain an image of which luminance of each pixel included in a predetermined image is corrected using the predetermined data as input data of the learned artificial intelligence model.

For example, the response unit 920 may use an image as input data of the learned artificial intelligence model and obtain an image of which luminance value of each pixel included in the image is corrected.

According to an embodiment, the learning unit 910 and the response unit 920 may be implemented in the external server 900, but this is merely exemplary, and the learning unit 910 and the response unit 920 can be implemented inside the electronic device 100. Specifically, at least a portion of the learning unit 910 and at least a portion of the response unit 920 may be implemented as software modules or at least one hardware chip form and mounted in the electronic device 100. For example, at least one of the learning unit 910 and the response unit 920 may be manufactured in the form of an exclusive-use hardware chip for artificial intelligence (AI), or a conventional general purpose processor (e.g., a CPU or an application processor) or a graphics-only processor (e.g., a GPU) and may be mounted on various electronic devices as described above. Herein, the exclusive-use hardware chip for artificial intelligence is a dedicated processor for probability calculation, and it has higher parallel processing performance than existing general purpose processor, so it can quickly process computation tasks in artificial intelligence such as machine learning. When the learning unit 910 and the response unit 920 are implemented as a software module (or a program module including an instruction), the software module may be stored in a computer-readable non-transitory computer readable media. In this case, the software module may be provided by an operating system (OS) or by a predetermined application. Alternatively, some of the software modules may be provided by an O/S, and some of the software modules may be provided by a predetermined application.

In this case, the learning unit 910 and the response unit 920 may be mounted on one electronic device, or may be mounted on separate electronic devices, respectively. For example, one of the learning unit 910 and the response unit 920 may be implemented in the electronic device 100, and the other one may be implemented in an external server. In addition, the learning unit 910 and the response unit 920 may provide the model information constructed by the learning unit 910 to the response unit 920 via wired or wireless communication, and provide data which is input to the response unit 920 to the learning unit 910 as additional data.

Figure 10:
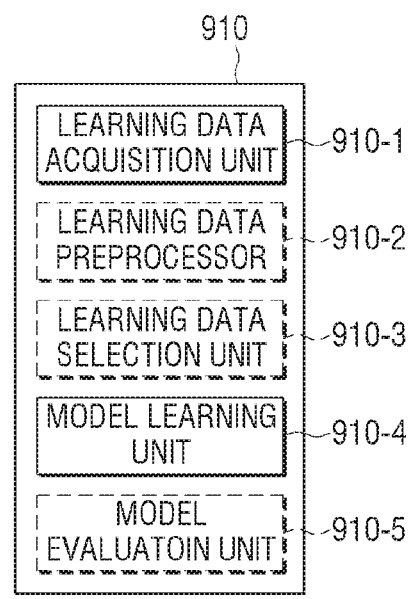
FIG. 10 is a block diagram illustrating a learning unit according to an embodiment.

FIG. 10 is a block diagram illustrating a learning unit according to an embodiment.

Referring to FIG. 10, the learning unit 910 according to some embodiments may implement a learning data acquisition unit 910-1 and a model learning unit 910-4. The learning unit 910 may further selectively implement at least one of a learning data preprocessor 910-2, a learning data selection unit 910-3, and a model evaluation unit 910-5.

The learning data acquisition unit 910-1 may obtain learning data necessary for the artificial intelligence model for correcting the luminance value of the image. The learning data acquisition unit 910-1 can obtain a plurality of sample images or information corresponding to each of a plurality of sample images as learning data. The learning data may be data collected or tested by the learning unit 910 or the manufacturer of the learning unit 910.

The model learning unit 910-4 can use the learning data so that the artificial intelligence model has a criterion for correcting the luminance value of the image. For example, the model learning unit 910-4 can learn an artificial intelligence model through supervised learning of at least a part of the learning data. Alternatively, the model learning unit 910-4 may learn, for example, by itself using learning data without specific guidance to make the artificial intelligence model learn through unsupervised learning which detects a criterion for providing correction for a luminance value. Also, the model learning unit 910-4 can learn the artificial intelligence model through reinforcement learning using, for example, feedback on whether the result of providing the response according to learning is correct. The model learning unit 910-4 can also make an artificial intelligence model learn using, for example, a learning algorithm including an error back-propagation method or a gradient descent.

In addition, the model learning unit 910-4 may learn a selection criterion about which learning data should be used for correcting a luminance value of an image using input data.

The model learning unit 910-4 can determine an artificial intelligence model having a great relevance between the input learning data and the basic learning data as an artificial intelligence model to be learned when there are a plurality of artificial intelligence models previously constructed. In this case, the basic learning data may be pre-classified according to the type of data, and the AI model may be pre-constructed for each type of data.

When the artificial intelligence model is learned, the model learning unit 910-4 can store the learned artificial intelligence model. In this case, the model learning unit 910-4 can store the learned artificial intelligence model in the memory of the external server 900. Alternatively, the model learning unit 910-4 may store the learned artificial intelligence model in a memory of a server or an electronic device connected to the external server 900 via a wired or wireless network.

The learning unit 910 may further implement a learning data preprocessor 910-2 and a learning data selection unit 910-3 to improve the response result of the artificial intelligence model or to save resources or time required for generation of the artificial intelligence model.

The learning data preprocessor 910-2 can preprocess acquired data so that the data obtained in the learning for correcting the luminance value of the image can be used. That is, the learning data preprocessor 910-2 can process the acquired data into a predetermined format. For example, the learning data preprocessor 910-2 can classify the sample image into a plurality of local areas.

The learning data selection unit 910-3 can select data required for learning from the data acquired by the learning data acquisition unit 910-1 or the data preprocessed by the learning data preprocessor 910-2. The selected learning data may be provided to the model learning unit 910-4. The learning data selection unit 910-3 can select learning data necessary for learning from the acquired or preprocessed data in accordance with a predetermined selection criterion. The learning data selection unit 910-3 may also select learning data according to a predetermined selection criterion by learning by the model learning unit 910-4.

The learning unit 910 may further implement the model evaluation unit 910-5 to improve a response result of the artificial intelligence model.

The model evaluation unit 910-5 may input evaluation data to the artificial intelligence model, and if the response result which is output from the evaluation result does not satisfy a predetermined criterion, the model evaluation unit may make the model learning unit 910-4 learn again.

When there are a plurality of learned artificial intelligence models, the model evaluation unit 910-5 may evaluate whether each learned artificial intelligence model satisfies a predetermined criterion, and determine the model which satisfies a predetermined criterion as a final artificial intelligence model. Here, when there are a plurality of models that satisfy a predetermined criterion, the model evaluation unit 910-5 may determine one or a predetermined number of models which are set in an order of higher evaluation score as a final artificial intelligence model.

Figure 11:
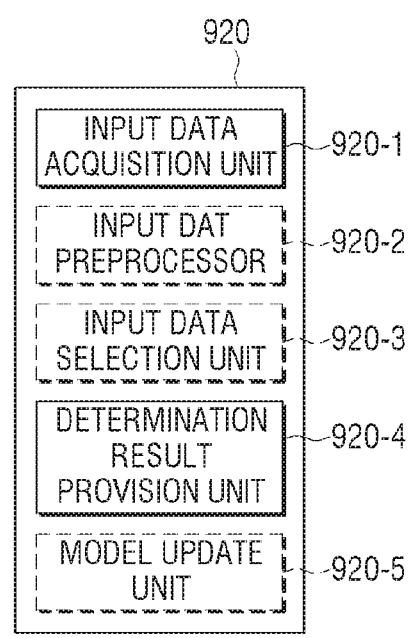
FIG. 11 is a block diagram illustrating a response unit according to an embodiment.

FIG. 11 is a block diagram illustrating a response unit according to an embodiment.

Referring to FIG. 11, the response unit 920 according to some embodiments may implement the input data acquisition unit 920-1 and the response result provision unit 920-4.

In addition, the response unit 920 may further implement at least one of an input data preprocessor 920-2, an input data selection unit 920-3, and a model update unit 920-5 in a selective manner.

The input data acquisition unit 920-1 may obtain data necessary for correcting the luminance value of the image. The response result provision unit 920-4 may apply the input data obtained from the input data acquisition unit 920-1 to the learned artificial intelligence model as an input value to obtain an image in which the luminance value of the image is corrected. The response result provision unit 920-4 applies the data selected by the input data preprocessor 920-2 or the input data selection unit 920-3 to be described later to the AI model to obtain the response result. The response result can be determined by the AI model.

According to an embodiment, the response result provision unit 920-4 may apply the artificial intelligence model which corrects the luminance value of the image obtained from the input data acquisition unit 920-1 to obtain the image in which the luminance value is corrected.

The response unit 920 may further implement the input data preprocessor 920-2 and the input data selection unit 920-3 in order to improve a response result of the AI model or save resources or time to provide the response result.

The input data preprocessor 920-2 may preprocess the acquired data so that the acquired data can be used to correct the luminance value of the image. That is, the input data preprocessor 920-2 can process the obtained data into the pre-defined format by the response result provision unit 920-4.

The input data selection unit 920-3 can select data required for providing a response from the data acquired by the input data acquisition unit 920-1 or the data preprocessed by the input data preprocessor 920-2. The selected data may be provided to the response result provision unit 920-4. The input data selection unit 920-3 can select some or all of the obtained or preprocessed data according to a predetermined selection criterion for providing a response. The input data selection unit 920-3 can also select data according to a predetermined selection criterion by learning by the model learning unit 910-4.

The model update unit 920-5 can control the updating of the artificial intelligence model based on the evaluation of the response result provided by the response result provision unit 920-4. For example, the model update unit 920-5 may provide the response result provided by the response result provision unit 920-4 to the model learning unit 910-4 so that the model learning unit 910-4 can ask for further learning or updating the AI model.

Figure 12:
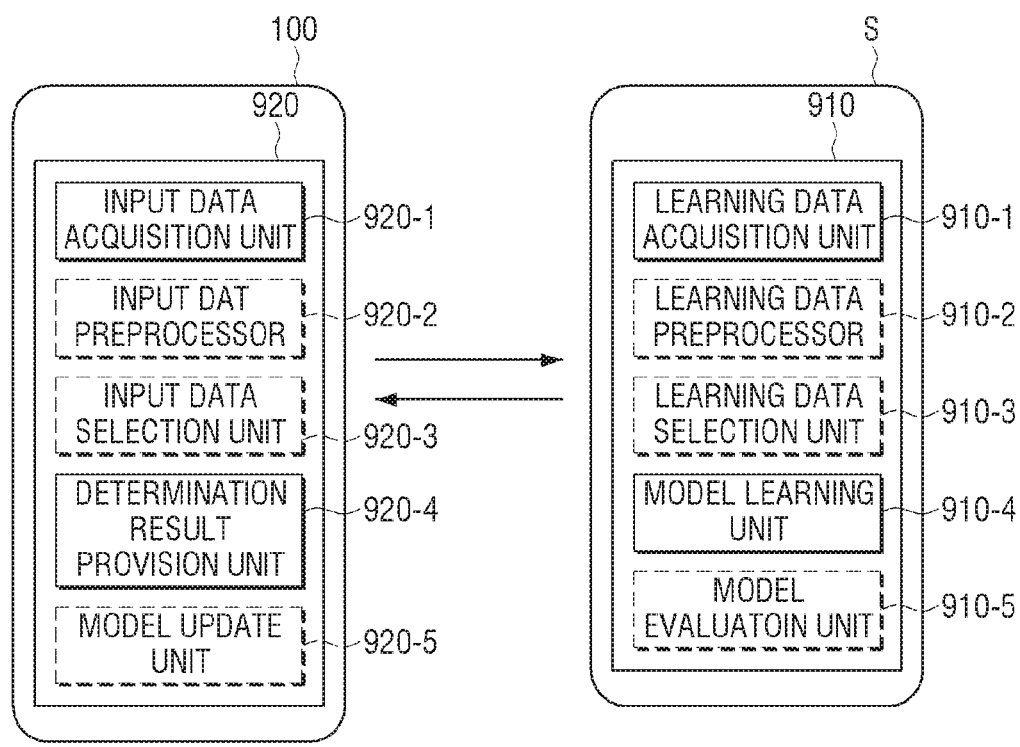
FIG. 12 is a view illustrating an example of learning and determining data by interlocking an electronic device and an external server according to an embodiment.

FIG. 12 is a view illustrating an example of learning and determining data by interlocking an electronic device 100 and an external server (S) according to an embodiment.

Referring to FIG. 12, an external server (S) may learn a criterion for correcting a luminance value of an image, and the electronic device 100 may provide an image in which the luminance value is corrected based on the learning result by the server (S).

In this case, the model learning unit 910-4 of the server S can perform the function of the learning unit 910 shown in FIG. 10. That is, the model learning unit 910-4 of the server S may learn criteria regarding which text information or state information of the electronic device should be used to correct the luminance value of the image, and how to correct the luminance value using the aforementioned information.

The response result provision unit 920-4 of the electronic device 100 applies the data selected by the input data selection unit 920-3 to the artificial intelligence model generated by the server S to obtain the image of which luminance value is corrected. Alternatively, the response result provision unit 920-4 of the electronic device 100 may receive the artificial intelligence model generated by the server S from the server S, and obtain the image of which the luminance value is corrected using the received artificial intelligence model.

Figure 13:
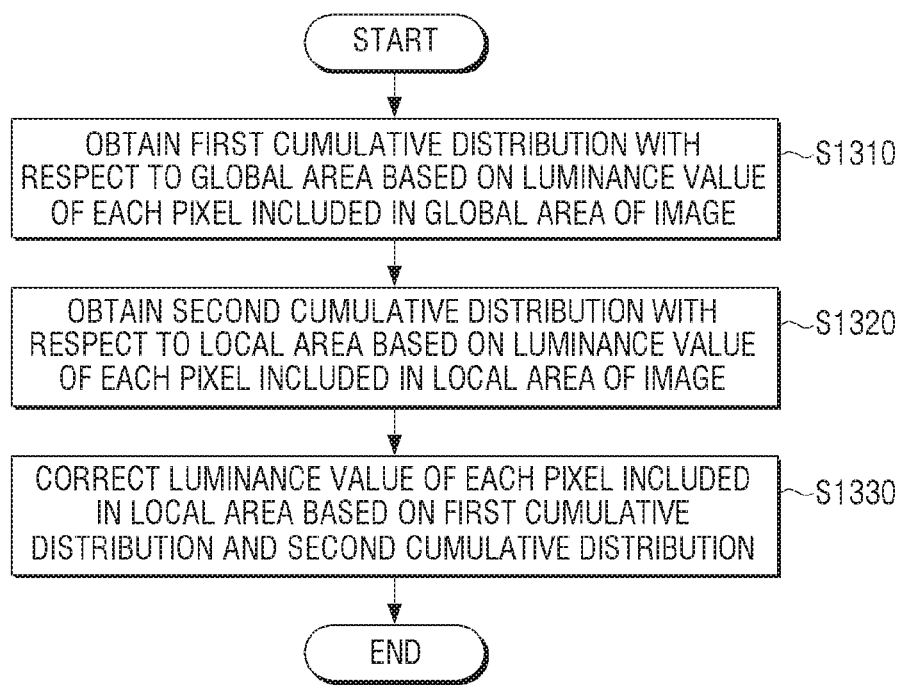
FIG. 13 is a flowchart to describe a controlling method of an electronic device according to an embodiment.

FIG. 13 is a flowchart to describe a controlling method of an electronic device according to an embodiment.

First, a first cumulative distribution for the global area is obtained based on the luminance value of each pixel included in the global area of the image (S1310). Then, a second cumulative distribution for the local area is obtained based on the luminance value of each pixel included in the local area of the image (S1320). Then, the luminance value of each pixel included in the local area is corrected based on the first cumulative distribution and the second cumulative distribution (S1330).

Here, the step of correcting (S1330) may include obtaining a first luminance value corresponding to a cumulative number of pixels of a first ratio for the total cumulative number of pixels in each of the first cumulative distribution and the second cumulative distribution, and obtaining a correction function for correcting the luminance value of each pixel included in the local area based on the first luminance value obtained in each of the first cumulative distribution and the second cumulative distribution.

The step of correcting (S1330) further includes obtaining a second luminance value corresponding to a cumulative number of pixels of a second ratio for the total cumulative number of pixels in each of the first cumulative distribution and the second cumulative distribution and the step of acquiring the correction function includes a step of calculating a correction function for correcting the luminance value of each pixel included in the local area based on the first luminance value and the second luminance value obtained in each of the first cumulative distribution and the second cumulative distribution.

If the luminance value of each pixel included in the local area is corrected, the step of updating the first cumulative distribution based on the corrected luminance value, obtaining the third cumulative distribution regarding another local area based on the luminance value of each pixel included in other local area of an image, and correcting the luminance value of each pixel included in another local area based on the updated first cumulative distribution and the third cumulative distribution can be further included.

In addition, the step of acquiring the first cumulative distribution (S1310) may include acquiring the first cumulative distribution by identifying the number of pixels having a luminance value less than or equal to each of the plurality of luminance values in the global area of the image, the step of obtaining second cumulative distribution (S1320) may include acquiring the second cumulative distribution by identifying the number of pixels having a luminance value smaller than or equal to each of the plurality of luminance values in the local area of the image.

If the luminance value of the pixel included in the local area of the image is equal to or less than the predetermined first threshold value, the correcting step (S1330) may include correcting the luminance value of the pixel included in the local area of the image, and if the luminance value is equal to or greater than a predetermined second threshold value, the correcting step may include correcting to the fourth luminance value.

The step of acquiring at least one of the type of the image and the photographing environment of the image based on the image classification model may be further included, and the step of correcting (S1330) may include correcting a luminance value of each pixel included in a local area based on at least one of the acquired image type and image capturing environment. Here, the image classification model may learn and acquire a plurality of sample images and information corresponding to each of the plurality of sample images through the artificial intelligence algorithm.

Here, the image capturing environment may include at least one of a type of lighting of an environment in which the image is captured and a location of lighting.

Additionally, the step of identifying a local area based on a luminance distribution of a global area of an image can be further included.

The displaying the image of which the luminance value is corrected can be further included.

According to various embodiments as described above, an electronic device compares the luminance distribution of the global area of the image with the luminance distribution of the local area to correct the luminance value of the local area and can provide an image of which luminance distribution is uniform.

In accordance with the embodiment of the present disclosure, the various embodiments described above may be practiced with other computer-readable media including instructions stored on a machine-readable storage medium. The device may include an electronic device (e.g., electronic device 100) in accordance with the disclosed embodiments as an apparatus that is operable to invoke stored instructions from the storage medium and act upon the called instructions. When an instruction is executed by a processor, the processor may perform the function corresponding to the instruction, either directly, or using other components under the control of the processor. The instructions may include code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

Also, in accordance with one embodiment of the present disclosure, a method according to various embodiments described above may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily, or at least temporarily, in a storage medium such as a manufacturer's server, a server of an application store, or a memory of a relay server.

Also, in accordance with one embodiment of the present disclosure, the various embodiments described above may be embodied as computer-readable codes on a computer or similar device using software, hardware, or may be implemented in a recording medium. In some cases, the embodiments described herein may be implemented by the processor itself. According to a software implementation, embodiments such as the procedures and functions described herein may be implemented in separate software modules. Each of the software modules may perform one or more of the functions and operations described herein.

Computer instructions for performing the processing operations of a device according to various embodiments described above may be stored in a non-transitory computer-readable medium. The computer instructions stored in the non-volatile computer-readable medium cause a particular device to perform a processing operation on the device according to various embodiments described above when executed by a processor of the particular device. Non-transitory computer readable media is a medium that stores data and is readable by the device. Specific examples of non-transitory computer readable media include CD, DVD, hard disk, Blu-ray disk, USB, memory card, ROM, etc.

Further, each of the components (for example, modules or programs) according to the above-described various embodiments may be composed of one or a plurality of entities, and some subcomponents of the above-mentioned subcomponents may be omitted, or other subcomponents may be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitive, or heuristically manner, or at least some operations may be performed in a different order.

Hereinabove, although the embodiments of the present disclosure have been shown and described, it should be understood that the present disclosure is not limited to the disclosed embodiments and may be variously modified without departing from the spirit and the scope of the present disclosure. Therefore, the modifications should not be understood separately from the technical spirit or scope of the present disclosure.

What is claimed is:

1. An electronic device comprising:
a storage; and
a processor configured to:
identify, based on a luminance value of each pixel included in a global area that represents an entire area of an image stored in the storage, a first cumulative distribution of the global area,
identify, based on a luminance value of each pixel included in a local area that represents a partial area of the image, a second cumulative distribution of the local area,
correct the luminance value of each pixel included in the local area based on the first cumulative distribution and the second cumulative distribution,
based on the luminance value of each pixel included in the local area being corrected, update the first cumulative distribution based on the corrected luminance value of each pixel included in the local area,
identify a third cumulative distribution with respect to another local area based on a luminance value of each pixel included in the other local area of the image,
correct the luminance value of each pixel included in the other local area based on the updated first cumulative distribution and the third cumulative distribution, and
generate a corrected image signal based on the corrected luminance value of each pixel included in the local area and each pixel included in the other local area.

2. The electronic device as claimed in claim 1, wherein the processor is further configured to:
identify a first global luminance value corresponding to a first ratio with respect to a first total cumulative pixel number in the first cumulative distribution,
identify a first local luminance value corresponding to the first ratio with respect to a second total cumulative pixel number in the second cumulative distribution,
identify a correction function to correct the luminance value of each pixel included in the local area based on the first global luminance value and the first local luminance value, and
generate the corrected image signal based on the correction function.

3. The electronic device as claimed in claim 2, wherein the processor is further configured to:
identify a second global luminance value corresponding to a second ratio with respect to the first total cumulative pixel number in the first cumulative distribution,
identify a second local luminance value corresponding to the second ratio with respect to the second cumulative distribution, and
identify the correction function to correct the luminance value of each pixel included in the local area based on the first global luminance value, the first local luminance value, the second global luminance value and the second local luminance value.

4. The electronic device as claimed in claim 1, wherein the processor is further configured to:
identify the first cumulative distribution by identifying a number of pixels having a luminance value less than or equal to each of a plurality of luminance values in the global area of the image, and
identify the second cumulative distribution by identifying a number of pixels having a luminance value less than or equal to each of the plurality of luminance values in the local area of the image.

5. The electronic device as claimed in claim 1, wherein the processor is further configured to:
correct a luminance value of a pixel included in the local area to a third luminance value based on the luminance value being less than or equal to a first threshold value, and correct a luminance value of a pixel included in the local area to a fourth luminance value based on the luminance value being less greater or equal to a second threshold value.

6. The electronic device as claimed in claim 1, wherein the processor is further configured to:
identify at least one from among a type of the image and a capturing environment of the image based on a classification model stored in the storage, and
correct the luminance value of each pixel included in the local area based on at least one from among the type of the image and the capturing environment of the image,
wherein the classification model learns and acquires a plurality of sample images and information corresponding to each of the plurality of sample images through an artificial intelligence algorithm.

7. The electronic device as claimed in claim 6, wherein the processor is further configured to identify the capturing environment of the image based on at least one from among a lighting type and a lighting position of the capturing environment.

8. The electronic device as claimed in claim 1, wherein the processor is further configured to identify the local area based on a global luminance distribution of the global area of the image.

9. The electronic device as claimed in claim 1, further comprising:
a display,
wherein the processor is further configured to control the display based on the corrected image signal.

10. A method of controlling an electronic device, the method comprising:
identifying, based on a luminance value of each pixel included in a global area that represents an entire area of an image stored in a storage, a first cumulative distribution of the global area;
identifying, based on a luminance value of each pixel included in a local area that represents a partial area of the image, a second cumulative distribution of the local area;
correcting the luminance value of each pixel included in the local area based on the first cumulative distribution and the second cumulative distribution;
updating the first cumulative distribution based on the corrected luminance value of each pixel included in the local area;
identifying a third cumulative distribution with respect to another local area based on a luminance value of each pixel included in the other local area of the image;
correcting the luminance value of each pixel included in the other local area based on the updated first cumulative distribution and the third cumulative distribution; and
generating a corrected image signal based on the corrected luminance value of each pixel included in the local area and each pixel included in the other local area.

11. The method as claimed in claim 10, wherein the correcting comprises:
identifying a first global luminance value corresponding to a first ratio with respect to a first total cumulative pixel number in the first cumulative distribution;
identifying a first local luminance value corresponding to the first ratio with respect to a second total cumulative pixel number in the second cumulative distribution;
identifying a correction function to correct the luminance value of each pixel included in the local area based on the first global luminance value and the first local luminance value; and
generating the corrected image signal based on the correction function.

12. The electronic device as claimed in claim 11, wherein the correcting further comprises:
identifying a second global luminance value corresponding to a second ratio with respect to the first total cumulative pixel number in the first cumulative distribution; and
identifying a second local luminance value corresponding to the second ratio with respect to the second cumulative distribution,
wherein the identifying the correction function is based on the first global luminance value, the first local luminance value, the second global luminance value and the second local luminance value.

13. The method as claimed in claim 10, wherein the identifying the first cumulative distribution comprises:
identifying the first cumulative distribution by identifying a number of pixels having a luminance value less than or equal to each of a plurality of luminance values in the global area of the image; and
identifying the second cumulative distribution by identifying a number of pixels having a luminance value less than or equal to each of the plurality of luminance values in the local area of the image.

14. The method as claimed in claim 10, wherein the correcting comprises:
correcting a luminance value of a pixel included in the local area to a third luminance value based on the luminance value being less than or equal to a first threshold value; and
correcting a luminance value of a pixel included in the local area to a fourth luminance value based on the luminance value being less greater or equal to a second threshold value.

15. A device comprising:
a display interface; and
a processor configured to:
control the display interface based on an image;
identify a plurality of local areas, each of the plurality of local areas representing a partial area of the image;
identify, based on a luminance value of each pixel in included in a global area that represents an entire area of the image, a first cumulative distribution of the global area;
identify, based on a luminance value of each pixel included in a first local area from among the plurality of local areas, a second cumulative distribution of the first local area;
correct the luminance value of each pixel included in the first local area based on the first cumulative distribution and the second cumulative distribution to generate a corrected luminance value of each pixel included in the first local area;
update the image based on the corrected luminance value of each pixel included in the first local area;
identify an updated first cumulative distribution based on the corrected luminance value of each pixel included in the first local area;
identify, based on a luminance value of each pixel included in a second local area from among the plurality of local areas of the image, a third cumulative distribution of the second local area;
correct the luminance value of each pixel included in the second local area based on the updated first cumulative distribution and the third cumulative distribution to generate a corrected luminance value of each pixel included in the second local area; and
update the image based on the corrected luminance value of each pixel included in the second local area.

16. The device as claimed in claim 15, further comprising a communication interface,
wherein the processor is further configured to:
control the communication interface to transmit a command to a user terminal that causes the user terminal to execute a camera application;
receive, from the user terminal, a notification indicating that the camera application is executed;
control the display interface to display a guide image;
receive, from the user terminal, a captured image of the guide image and background; and
update the image based on the captured image received from the user terminal.

17. The device as claimed in claim 16, wherein the processor is further configured to:
receive an editing command from the user terminal; and
update the image based on the editing command received from the user terminal.

18. The device as claimed in claim 15, further comprising an illumination sensor,
wherein the processor is further configured to update the image based on a lighting position indicated by an illumination signal generated by the illumination sensor.

* * * * *